US012750744B2

(12) United States Patent
Tabet et al.

(10) Patent No.: US 12,750,744 B2
(45) Date of Patent: Sep. 29, 2026

(54) LOCAL COORDINATED COMMUNICATIONS FOR USER EQUIPMENT DEVICES

(71) Applicant: Apple Inc., Cupertino, CA (US)

(72) Inventors: Tarik Tabet, Carlsbad, CA (US); Said Medjkouh, San Diego, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 656 days.

(21) Appl. No.: 18/180,010

(22) Filed: Mar. 7, 2023

(65) Prior Publication Data

US 2023/0300690 A1 Sep. 21, 2023

Related U.S. Application Data

(60) Provisional application No. 63/321,006, filed on Mar. 17, 2022.

(51) Int. Cl.
*H04W 36/00* (2009.01)
*H04W 36/06* (2009.01)

(52) U.S. Cl.
CPC ....... *H04W 36/0058* (2018.08); *H04W 36/06* (2013.01)

(58) Field of Classification Search
CPC .......................... H04W 36/06; H04W 36/0058
See application file for complete search history.

(56) References Cited

U.S. PATENT DOCUMENTS

| | | | | |
|---|---|---|---|---|
| 9,014,113 | B2 | 4/2015 | Bontu et al. | |
| 10,098,129 | B2 | 10/2018 | Lindoff et al. | |
| 2018/0270870 | A1 | 9/2018 | Jones | |
| 2019/0253915 | A1* | 8/2019 | Joseph | H04W 80/08 |
| 2019/0254117 | A1* | 8/2019 | Chen | H04L 47/34 |
| 2019/0268406 | A1 | 8/2019 | Avraham et al. | |
| 2020/0084682 | A1* | 3/2020 | Wang | H04W 36/00835 |
| 2020/0163140 | A1* | 5/2020 | Mochizuki | H04W 36/0069 |
| 2020/0382240 | A1* | 12/2020 | Centonza | H04W 76/12 |
| 2021/0084539 | A1* | 3/2021 | Centonza | H04W 28/06 |

(Continued)

FOREIGN PATENT DOCUMENTS

| | | | |
|---|---|---|---|
| CA | 2753776 | A1 | 3/2013 |
| CN | 112166572 | A | 1/2021 |

(Continued)

*Primary Examiner* — Melanie Jagannathan
(74) *Attorney, Agent, or Firm* — Treyz Law Group, P.C.; Michael H. Lyons

(57) ABSTRACT

A network may include user equipment (UE) devices and a base station that communicates using a control unit (CU) and a data unit (DU). A primary UE may duplicate the DU and a subset of control functions of the CU. When the DU on the primary UE is active, the base station and primary UE may effectuate a split or bearer duplication of the DU at the RLC/PDCP/MAC layer between the primary UE and the base station. Data may be concurrently routed data through the primary UE using inter-UE links and direct cellular telephone links to the base station. When the subset of the control functions of the CU are active on the primary UE, the device may perform RRC functions, MAC control functions, RLC control functions, or other control functions to generate information for use by the base station in updating communications.

20 Claims, 11 Drawing Sheets

(56) References Cited

U.S. PATENT DOCUMENTS

| | | | | |
|---|---|---|---|---|
| 2021/0159993 | A1* | 5/2021 | Studer | H04B 17/364 |
| 2021/0168758 | A1* | 6/2021 | Luo | H04W 76/15 |
| 2021/0235247 | A1 | 7/2021 | Lee et al. | |
| 2021/0352762 | A1* | 11/2021 | Dong | H04W 28/18 |
| 2021/0368404 | A1* | 11/2021 | Comstock | H04W 36/00 |
| 2022/0022239 | A1* | 1/2022 | Fan | H04L 1/08 |
| 2023/0077500 | A1* | 3/2023 | Qu | H04W 76/20<br>370/329 |
| 2023/0092788 | A1* | 3/2023 | Kovács | H04W 52/0258<br>370/311 |
| 2023/0199895 | A1* | 6/2023 | Zhang | H04W 72/1263<br>370/329 |
| 2024/0057218 | A1* | 2/2024 | Zhang | H04L 1/1685 |
| 2024/0064493 | A1* | 2/2024 | Babaei | H04W 4/06 |
| 2024/0187147 | A1* | 6/2024 | Park | H04W 80/08 |
| 2024/0324042 | A1* | 9/2024 | Wang | H04W 76/27 |
| 2024/0340738 | A1* | 10/2024 | Hwang | H04W 36/0011 |
| 2024/0397545 | A1* | 11/2024 | Min | H04W 72/04 |
| 2024/0406806 | A1* | 12/2024 | Chandrashekar | H04W 36/0007 |
| 2025/0048171 | A1* | 2/2025 | Bin Redhwan | H04W 28/0236 |
| 2025/0159561 | A1* | 5/2025 | Mochizuki | H04W 36/0094 |
| 2026/0019838 | A1* | 1/2026 | Kalia | H04L 43/028 |

FOREIGN PATENT DOCUMENTS

| | | | |
|---|---|---|---|
| EP | 3800935 | A1 | 4/2021 |
| WO | 2021087857 | A1 | 5/2021 |

* cited by examiner

LOCAL COORDINATED COMMUNICATIONS FOR USER EQUIPMENT DEVICES

This application claims the benefit of U.S. Provisional Patent Application No. 63/321,006, filed Mar. 17, 2022, which is hereby incorporated by reference herein in its entirety.

FIELD

This disclosure relates generally to wireless communications, including wireless communications performed by user equipment devices.

BACKGROUND

Communications systems often include user equipment devices that convey wireless data with a wireless base station. The wireless base station has a corresponding coverage area. In practice, different user equipment devices are located at different locations within the coverage area and may have different communications capabilities or link qualities. Some of the user equipment devices may also move over time, changing their wireless performance in communicating with the wireless base station. If care is not taken, it can be difficult to provide optimized wireless communications for each of the user equipment devices in these environments.

SUMMARY

A communications network may include user equipment (UE) devices and external communications equipment such as a wireless base station. The base station may perform communications with UE devices in its cell using a control unit (CU) and a data unit (DU). The base station may select one or more of the UE devices to serve as a primary UE device, whereas the other UE devices are secondary UE devices. The base station may activate a DU and/or a micro-representation of the CU on the primary UE device to configure the primary UE device to boost wireless communications for the secondary UE devices and to offload some procedures from the base station to the primary UE device. The DU on the primary UE device may be a duplicate of the DU on the base station. The micro-representation of the CU on the primary UE device may include a duplication of a subset of control functions from the CU on the base station.

When the DU on the primary UE device is active, the base station and primary UE device may effectuate a split or bearer duplication of the DU at the RLC/PDCP layer between the primary UE device and the base station. The primary UE device may route a first portion of wireless data between the secondary UE devices and the base station using first signals conveyed between the primary and secondary UE devices (e.g., sidelink signals, cellular signals, Wi-Fi signals, P2P signals, Bluetooth signals, device-to-device signals, etc.) and using second signals conveyed between the primary UE device and the base station (e.g., sidelink signals, cellular signals, Wi-Fi signals, P2P signals, Bluetooth signals, device-to-device signals, etc.). The secondary UE devices may concurrently convey (transmit or receive) a second portion of the wireless data using cellular telephone signals conveyed between the secondary UE devices and the base station. This may boost the overall wireless data throughput of the secondary UE devices.

When the micro-representation of the CU on the primary UE device is active, the primary UE device may perform a subset of the control functions from the CU of the base station. The control functions of the CU that are performed by the primary UE device may include one or more RRC control functions, MAC control functions, RLC control functions, etc. The primary UE device may perform mobility management and measurement operations that are usually performed at the base station to gather mobility and measurement information from the secondary UE devices using the sidelink signals. The primary UE device may transmit the mobility and measurement information to the base station for use in updating communications with the secondary UE devices. For example, the primary UE device may perform channel charting on the secondary UE devices to generate a neighbors map characterizing the channel conditions of the secondary UE devices. The primary UE device may transmit the neighbors map to the base station. The base station may process the neighbors map and may update beamforming or perform other operations based on the neighbors map.

An aspect of the disclosure provides a user equipment (UE) device. The user equipment can include one or more antennas. The user equipment device can include a radio configured to convey first radio signals using the one or more antennas to communicate with a wireless base station that performs wireless functions characterized by a data unit (DU) and control unit (CU). The user equipment device can include one or more processors configured to duplicate one or more functions of a radio link control (RLC) layer, a packet data convergence protocol (PDCP) layer, or media access control (MAC) layer of the DU of the wireless base station. When activated by the wireless base station, the one or more functions may control the radio to route a first portion of wireless data between the wireless base station and an additional user equipment device using second radio signals conveyed between the user equipment device and the additional user equipment device while the additional user equipment device concurrently conveys a second portion of the wireless data with the wireless base station using third radio signals conveyed between the additional user equipment device and the wireless base station.

An aspect of the disclosure provides a method of operating a user equipment (UE) device to wirelessly communicate with a set of additional user equipment devices and with a wireless base station that communicates with user equipment in a corresponding cell using data unit (DU) functions and control unit (CU) functions. The method can include receiving inter-UE signals from the set of additional user equipment devices. The method can include performing a subset of the CU functions of the wireless base station using the inter-UE signals received from the set of additional user equipment devices to gather measurement information associated with channel conditions of the set of additional user equipment devices. The method can include using radio-frequency signals to transmit the measurement information to the wireless base station.

An aspect of the disclosure provides a method. The method can include with a user equipment (UE) device, using cellular telephone signals to communicate with a wireless base station. The method can include with the user equipment device, receiving inter-UE signals from a set of additional user equipment devices. The method can include with the user equipment device, generating a neighbors map of the set of additional user equipment devices by performing channel charting on the set of additional user equipment devices using the inter-UE signals. The method can include with the user equipment device, using the cellular telephone signals to transmit the neighbors map to the wireless base station.

DETAILED DESCRIPTION

Figure 1:
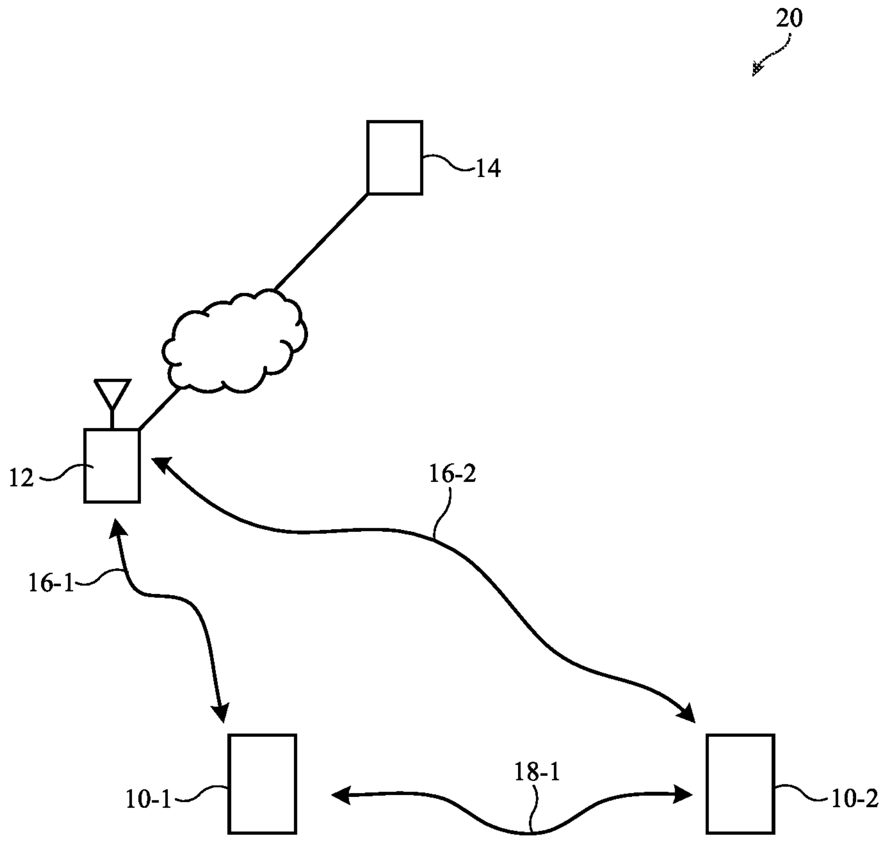
FIG. 1 is a diagram of an illustrative communications network having user equipment devices that communicate with a wireless base station in accordance with some embodiments.

FIG. 1 is a schematic diagram of an illustrative communications system 20 (sometimes referred to herein as communications network 20) for conveying wireless data between communications terminals. Communications system 20 may include network nodes (e.g., communications terminals). The network nodes may include user equipment (UE) such as one or more UE devices 10. The network nodes may also include external communications equipment (e.g., communications equipment other than UE devices 10) such as external communications equipment 12. External communications equipment 12 may include a wireless base station, wireless access point, or other wireless equipment for example. Implementations in which external communications equipment 12 is a wireless base station that supports cellular telephone communications (e.g., voice and/or data signals) are described herein as an example. External communications equipment 12 may therefore sometimes be referred to herein as wireless base station 12, gNB 12, or simply as base station 12. UE devices 10 and base station 12 may communicate with each other using wireless communications links. If desired, UE devices 10 may wirelessly communicate with base station 12 without passing communications through any other intervening network nodes in communications system 20 (e.g., UE devices 10 may communicate directly with base station 12 over-the-air).

Communications system 20 may form a part of a larger communications network that includes network nodes coupled to base station 12 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in the larger communications network via base station equipment 12 (e.g., base station 12 may serve as an interface between user equipment devices 10 and the rest of the larger communications network).

Some or all of the communications network may, if desired, be operated by a corresponding network operator or service provider. One or more servers such as server 14 communicably coupled to base station 12. Server 14 may be an end host in communications with one or more UE devices 10 (e.g., UE devices 10 may themselves form end hosts of the network), may control the operation of base station 12 in communicating with UE devices, may serve wireless data for transmission to UE devices 10, may receive wireless data from UE devices 10 (via base station 12), etc. Server 14 may be operated by the network operator or service provider of base station 12, by a service provider associated with the operating system and/or manufacturer of one or more UE devices 10, or may be any other desired network node in communications system 20.

Base station 12 may include one or more antennas (e.g., antennas arranged in one or more phased antenna arrays for conveying signals at frequencies greater than 10 GHz or other antennas for conveying signals at lower frequencies)

that provides wireless coverage for UE devices 10 located within a corresponding geographic area or region, sometimes referred to as a cell. The size of the cell may correspond to the maximum transmit power level of base station 12 and the over-the-air attenuation characteristics for radio-frequency signals conveyed by base station 12, for example. When a UE device 10 is located within the cell, the UE device may communicate with base station 12 over a wireless link. To support the wireless link, base station 12 may transmit radio-frequency signals in a downlink (DL) direction from base station 12 to the UE device and/or the UE device may transmit radio-frequency signals in an uplink (UL) direction from the UE device to base station 12 (e.g., the wireless links may be bidirectional links).

In the example of FIG. 1, a first UE device 10 such as UE device 10-1 and a second UE device 10 such as UE device 10-2 may be located in the vicinity of base station 12 (e.g., within the cell of base station 12). UE device 10-1 may therefore communicate with base station 12 over a corresponding wireless link. Radio-frequency signals 16-1 may be conveyed between UE device 10-1 and base station 12 to support the wireless link. Similarly, UE device 10-2 may communicate with base station 12 over a corresponding wireless link. Radio-frequency signals 16-2 may be conveyed between UE device 10-2 and base station 12 to support the wireless link. Radio-frequency signals 16 may therefore sometimes be referred to as network-UE signals 16, network signals 16, first radio-frequency signals 16, first radio signals 16, or primary signals 16. While examples are described herein in which radio-frequency signals 16 are cellular telephone signals, radio-frequency signals 16 may also include sidelink signals, wireless local area network (e.g., Wi-Fi) signals, peer-to-peer (P2P) signals, Bluetooth (BT) signals, device-to-device (D2D) signals, etc. If desired, radio-frequency signals 18 may also be conveyed between UE devices (e.g., without passing through other network nodes such as a base station). Radio-frequency signals 18 may therefore sometimes be referred to herein as inter-UE signals 18, UE-UE signals 18, second radio-frequency signals 18, second radio signals 18, or secondary signals 18. Inter-UE signals 18 may include wireless local area network (WLAN) signals (e.g., Wi-Fi signals), Bluetooth (BT) signals, sidelink signals, device-to-device (D2D) signals, and/or cellular telephone signals conveyed according to a cellular telephone protocol (e.g., because the primary UE device has a hybrid node role as both a UE device and a base station). D2D signals in inter-UE signals 18 may be transmitted at relatively low frequencies such as frequencies in a frequency band below 1 GHz, below 2 GHz, below 3 GHz, below 950 MHz, or may be transmitted at higher frequencies. The wireless circuitry in UE device 10-1 may include a dedicated radio for transmitting D2D signals or the radio that transmits D2D signals may also transmit other signals associated with other communications protocols or RATs (e.g., a single radio on UE device 10-1 may convey both WLAN signals and D2D signals, a single radio on UE device 10-1 may convey both cellular telephone signals and D2D signals, etc.). As shown in the example of FIG. 1, UE device 10-1 may communicate with UE device 10-2 using inter-UE signals 18-1. The example of FIG. 1 is merely illustrative and, in general, UE devices 10 may concurrently communicate with more than two base stations 12 and there may be any desired number of UE devices 10 in communication with each base station and/or each other.

Figure 2:
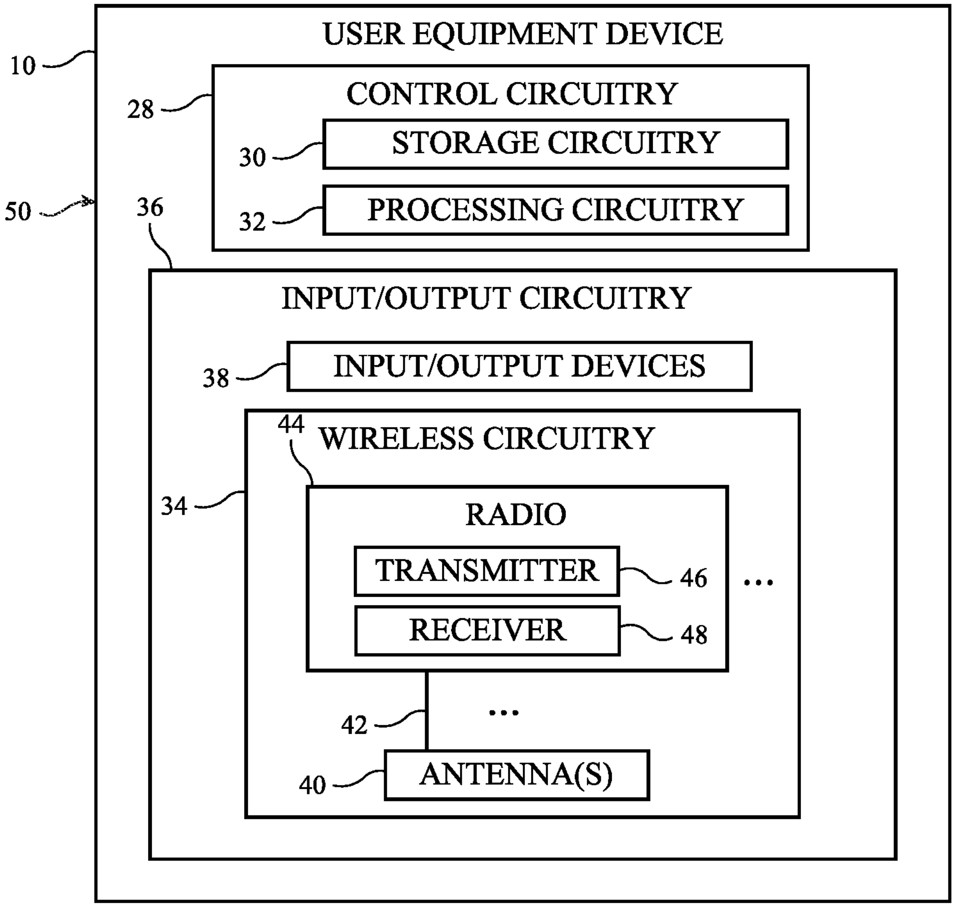
FIG. 2 is a schematic block diagram of an illustrative user equipment device in accordance with some embodiments.

FIG. 2 is a block diagram of an illustrative UE device 10 (e.g., one or both of UE devices 10-1 and 10-2 of FIG. 1). UE device 10 is an electronic device and may therefore sometimes be referred to herein as electronic device 10 or device 10. UE device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in FIG. 2, UE device 10 may include components located on or within an electronic device housing such as housing 50. Housing 50, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 50 may be formed from dielectric or other low-conductivity material (e.g., glass, ceramic, plastic, sapphire, etc.). In other situations, housing 50 or at least some of the structures that make up housing 50 may be formed from metal elements.

UE device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 30 may include storage that is integrated within UE device 10 and/or removable storage media.

Control circuitry 28 may include processing circuitry such as processing circuitry 32. Processing circuitry 32 may be used to control the operation of UE device 10. Processing circuitry 32 may include on one or more processors, microprocessors, microcontrollers, digital signal processors, host processors, baseband processor integrated circuits, application specific integrated circuits, central processing units (CPUs), graphics processing units (GPUs), etc. Control circuitry 28 may be configured to perform operations in UE device 10 using hardware (e.g., dedicated hardware or circuitry), firmware, and/or software. Software code for performing operations in UE device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on UE device 10 such as satellite navigation applications, internet browsing applications, voice-over-internet-protocol (VOIP) telephone call applications, email applications, media playback applications, operating system functions, etc. To support interactions with external communications equipment, control circuitry 28 may be used in implementing communications protocols. Communications protocols that may be implemented using control circuitry 28 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, 6G protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol. Radio-frequency signals conveyed using a cellular telephone protocol may sometimes be referred to herein as cellular telephone signals.

UE device 10 may include input-output circuitry 36. Input-output circuitry 36 may include input-output devices 38. Input-output devices 38 may be used to allow data to be supplied to UE device 10 and to allow data to be provided from UE device 10 to external devices. Input-output devices 38 may include user interface devices, data port devices, and other input-output components. For example, input-output devices 38 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 38 may be peripherals that are coupled to a main processing unit or other portion of UE device 10 via a wired or wireless link).

Input-output circuitry 36 may include wireless circuitry 34 to support wireless communications. Wireless circuitry 34 (sometimes referred to herein as wireless communications circuitry 34) may include one or more antennas 40. Wireless circuitry 34 may also include one or more radios 44. Radio 44 may include circuitry that operates on signals at baseband frequencies (e.g., baseband circuitry) and radio-frequency transceiver circuitry such as one or more radio-frequency transmitters 46 and one or more radio-frequency receivers 48. Transmitter 46 may include signal generator circuitry, modulation circuitry, mixer circuitry for upconverting signals from baseband frequencies to intermediate frequencies and/or radio frequencies, amplifier circuitry such as one or more power amplifiers, digital-to-analog converter (DAC) circuitry, control paths, power supply paths, switching circuitry, filter circuitry, and/or any other circuitry for transmitting radio-frequency signals using antenna(s) 40. Receiver 48 may include demodulation circuitry, mixer circuitry for downconverting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antenna(s) 40. The components of radio 44 may be mounted onto a single substrate or integrated into a single integrated circuit, chip, package, or system-on-chip (SOC) or may be distributed between multiple substrates, integrated circuits, chips, packages, or SOCs.

Antenna(s) 40 may be formed using any desired antenna structures for conveying radio-frequency signals. For example, antenna(s) 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 40 over time. If desired, two or more of antennas 40 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given/selected beam pointing direction (e.g., towards base station 12 of FIG. 1).

The term "convey radio-frequency signals" as used herein means the transmission and/or reception of the radio-frequency signals (e.g., for performing unidirectional and/or bidirectional wireless communications with external wireless communications equipment). Similarly, the term "convey wireless data" as used herein means the transmission and/or reception of wireless data using radio-frequency signals. Antenna(s) 40 may transmit the radio-frequency signals by radiating the radio-frequency signals into free space (or to free space through intervening device structures such as a dielectric cover layer). Antenna(s) 40 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

Each radio 44 may be coupled to one or more antennas 40 over one or more radio-frequency transmission lines 42. Radio-frequency transmission lines 42 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 42 may be integrated into rigid and/or flexible printed circuit boards if desired. One or more radio-frequency lines 42 may be shared between multiple radios 44 if desired. Radio-frequency front end (RFFE) modules may be interposed on one or more radio-frequency transmission lines 42. The radio-frequency front end modules may include substrates, integrated circuits, chips, or packages that are separate from radios 44 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 42.

Radio 44 may transmit and/or receive radio-frequency signals within corresponding frequency bands at radio frequencies (sometimes referred to herein as communications bands or simply as "bands"). The frequency bands handled by radio 44 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The example of FIG. 2 is merely illustrative. While control circuitry 28 is shown separately from wireless circuitry 34 in the example of FIG. 1 for the sake of clarity, wireless circuitry 34 may include processing circuitry (e.g., one or more processors) that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband circuitry (e.g., one or more baseband processors), digital control circuitry, analog control circuitry, and/or other control circuitry that forms part of radio 44. The baseband circuitry may, for example, access a communication protocol stack on control circuitry 28 (e.g., storage circuitry 30) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum (NAS) layer. If desired, the PHY layer operations may additionally or alternatively be performed by radio-frequency (RF) interface circuitry in wireless circuitry 34.

In practice, different UE devices 10 may have different wireless channel characteristics in communicating with base station 12 (FIG. 1). For example, UE devices 10 that are located farther from base station 12 may exhibit worse radio-frequency (wireless) performance (e.g., as characterized by one or more wireless performance metrics) than UE devices 10 that are located closer to base station 12, UE devices 10 that have a direct line-of-sight to base station 12 may exhibit better radio-frequency performance than UE devices 10 that do not have a line-of-sight to base station 12 (e.g., due to one or more intervening objects, the UE device being located indoors, etc.), etc. At the same time, some UE devices may have greater wireless communications capabilities than other UE devices (e.g., some UE devices 10 may have more battery power than other UE devices 10, some UE devices may have more recent hardware and/or software than other UE devices, some UE devices may have more processing power or speed and/or memory than other UE devices, etc.). In practice, it can be challenging to optimize wireless communications and to maximize wireless data throughput for each of the UE devices in the cell for base station 12 given each of these variable factors.

Figure 3:
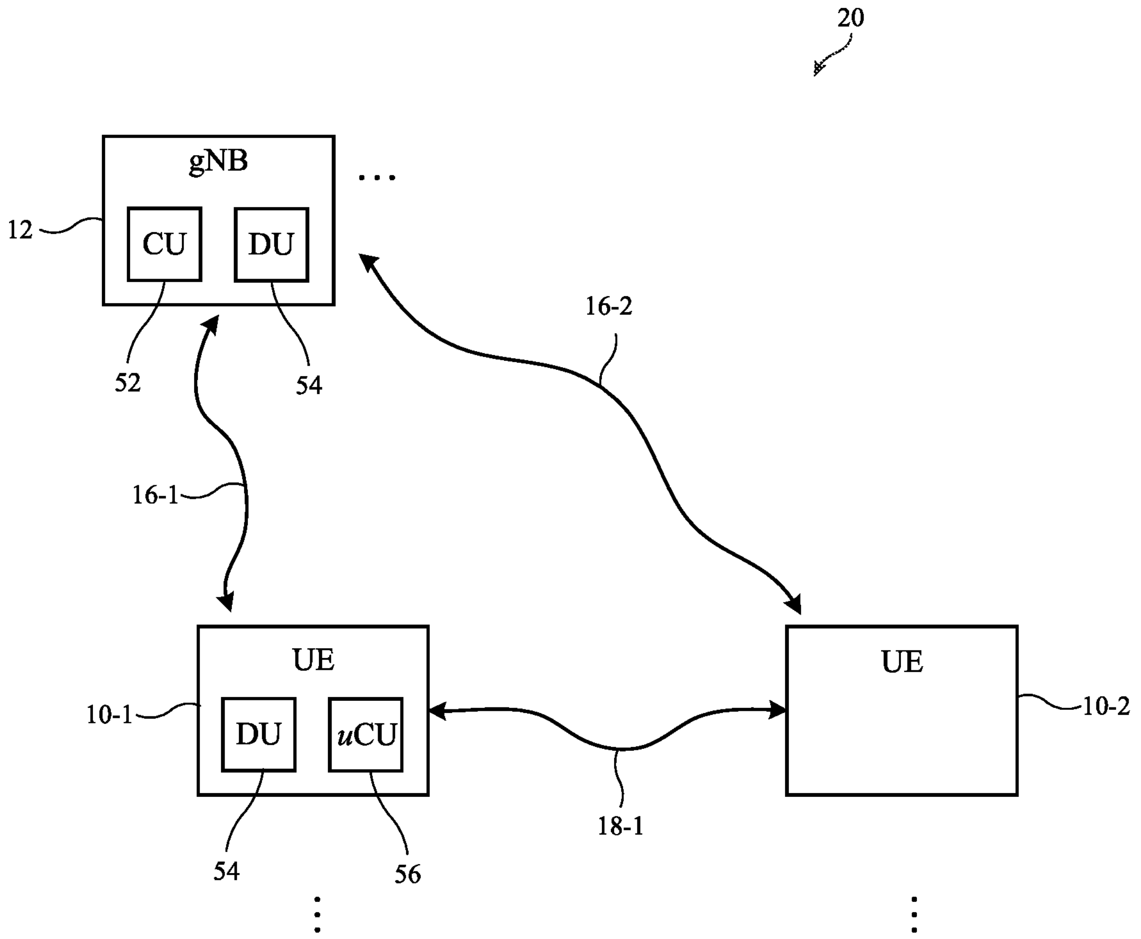
FIG. 3 is a diagram showing how an illustrative primary user equipment device may copy and perform data unit and control unit functions of a wireless base station to allow one or more secondary user equipment devices to communicate with the wireless base station directly and concurrently through the primary user equipment device in accordance with some embodiments.

To help mitigate these issues to optimize wireless communications and throughput for all of the UE devices in the vicinity of base station 12, one or more UE devices 10 such as UE device 10-1 may be configured to perform some of the functions of base station 12, as shown in the example of FIG. 3. The functions of base station 12 may be characterized by data unit (DU) functions and control unit (CU) functions. The DU functions (sometimes referred to simply as the DU) of base station 12 involve all functions linked to data communications/transfer between the UE devices and base station 12 such as radio link control (RLC) functions, packet data convergence protocol (PDCP) functions, service data adaptation protocol (SDAP) functions (e.g., functions that effectively form a pipeline for data transfer), and media access control (MAC) functions. The CU functions (sometimes referred to simply as the CU) of base station 12 are responsible for all control configuration for communications between the UE devices and base station 12 such as radio resource control (RRC) functions, RLC control functions, and media access control (MAC) control functions (e.g., functions that effectively control the pipeline of data transfer as formed by the DU). The DU and the CU may, for example, be defined by the Open RAN standards for cellular radio-access networks. The UE device 10 that is configured to perform these base station functions may sometimes be referred to herein as a primary UE device, a primary node, a booster UE device, or a booster node. UE device 10-1 may therefore sometimes be referred to herein as primary UE device 10-1, primary device 10-1, or booster UE device 10-1. The UE devices 10 that do not perform these base station functions, such as UE device 10-2, may sometimes be referred to herein as secondary UE devices or nodes. UE device 10-2 may therefore sometimes be referred to herein as secondary UE device 10-2 or secondary device 10-2.

As shown in FIG. 3, base station 12 may have a DU 54 and a CU 52. DU 54 and CU 52 may be implemented in hardware (e.g., one or more processors) and software (e.g., as executed by the one or more processors) on base station 12. Primary UE device 10-1 may be configured to implement some or all of the DU 54 of base station 12. For example, primary UE device 10-1 may have a hardware module (e.g., one or more processors) and corresponding software (e.g., as executed by the one or more processors) that can support and perform some or all of the DU operations of base station 12 when activated by base station 12. The DU 54 on primary UE device 10-1 may be, for example, a duplicate, replica, or copy of the DU 54 on base station 12. Base station 12 may issue a control command instructing UE device 10-1 to activate DU 54 when needed (e.g., to boost wireless communications for one or more secondary UE devices 10-2).

Inter-UE signals 18 may be used to help boost the wireless performance (e.g., throughput) of one or more secondary UE devices in the vicinity of primary UE device 10-1. For example, primary UE device 10-1 may use inter-UE signals 18-1 to boost the wireless performance of secondary UE device 10-2, which may be exhibit worse wireless performance than primary UE device 10-1 (e.g., due to secondary UE device 10-2 being located farther from base station 12 than primary UE device 10-1, due to obstacles being present between secondary UE device 10-2 and base station 12, due to secondary UE device 10-2 having inferior communications capabilities than primary UE device 10-1, due to secondary UE device 10-2 having lower battery than primary UE device 10-1, etc.). Primary UE device 10 may boost the wireless performance of secondary UE device 10-2 by allowing secondary UE device 10-2 to maintain a first communications link to base station 12 over radio-frequency signals 16-2 while concurrently maintaining a second communications link to base station 12 via inter-UE signals 18-1, primary UE device 10-1, and radio-frequency signals 16-1 (e.g., wireless data may be divided between inter-UE signals 18-1 and radio-frequency signals 16-2). In other words, primary UE device 10-1 may help to route some of the wireless data intended for communication between UE device 10-2 and base station 12 between base station 12 and UE device 10-2 using inter-UE signals 18-1 (e.g., while UE device 10-2 concurrently conveys some of the wireless data directly with base station 12 over radio-frequency signals 16-2).

Once DU 54 is activated on primary UE device 10-1, primary UE device 10-1 may perform all of the data routing functions wireless base station 12 (e.g., acting as an additional wireless base station for the point of view of wireless data routed for UE device 10-2). For example, activating DU 54 on primary UE device 10-1 may effectively form a bearer duplication/split for secondary UE device 10-2 between inter-UE signals 18-1 (primary UE device 10-1) and radio-frequency signals 16-2 (base station 12). Put differently, activating DU 54 on primary UE device 10-1 may split the bearer between base station 12 and primary UE device 10-1 at the PDCP layer, which is agnostic of the PHY layer, allowing primary UE device 10-1 to act as an extension of base station 12 in the data plane. This is unlike other D2D/mesh networks, which split the PHY layer between the two nodes.

When DU 54 is active on primary UE device 10-1, secondary UE device 10-2 may operate in an effective dual connectivity mode in which its wireless data for UL transmission and/or DL reception are split between inter-UE signals 18-1 and radio-frequency signals 16-2 (e.g., a dual connectivity mode where base station 12 and primary UE device 10-1 convey wireless data with secondary UE device 10-2 instead of two base stations 12 as in a 5G dual connectivity mode). For example, a first portion of a given set of wireless data (e.g., message data, voice data, application data, video data, cloud computing or processing data, or other data organized into data packets/frames, etc.) may be transmitted to base station 12 (and thus the rest of the network) via inter-UE signals 18-1, primary UE device 10-1 (e.g., acting as a base station in the data plane due to DU 54 on primary UE device 10-1), and radio-frequency signals 16-1 (e.g., for uplink). A second portion of the given set of wireless data may be concurrently transmitted to base station 12 (and thus the rest of the network) via radio-frequency signals 16-2 (e.g., for the uplink). Conversely, a first portion of a given set of wireless data may be received at secondary UE device 10-2 from base station 12 (and thus the rest of the network) via inter-UE signals 18-1, primary UE device 10-1 (e.g., acting as a base station in the data plane due to DU 54 on primary UE device 10-1), and inter-UE signals 18-1, while a second portion of the given set of wireless data is concurrently received from base station 12 via radio-frequency signals 16-2 (e.g., for the downlink). In this way, inter-UE signals 18-1 and primary UE device 10-1 may therefore serve to boost the wireless capabilities of secondary UE device 10-2, thereby optimizing its wireless performance.

In addition to splitting or duplicating the DU 54 of base station 12 at primary UE device 10-1, primary UE device 10-1 may be configured to implement some or all of the CU 52 of base station 12. For example, primary UE device 10-1 may have a hardware module (e.g., one or more processors) and corresponding software (e.g., as executed by the one or more processors) that can support and perform some of the CU operations of base station 12 when activated by base station 12, as micro-control unit (uCU) 56. uCU 56 on primary UE device 10-1 may be, for example, a micro-representation of CU 52 on base station 12 (e.g., a duplicate, replica, or copy of some of CU 52 on base station 12). Base station 12 may issue a control command instructing UE device 10-1 to activate uCU 56 when needed (e.g., to boost control of wireless communications for one or more secondary UE devices 10-2).

Offloading some of the CU functions of base station 12 (e.g., control functions associated with wireless communications) to primary UE device 10-1 in this way may help to optimize wireless performance for one or more secondary UE devices 10-2. For example, the CU functions performed by uCU 56 on primary UE device 10-1 may include radio resource management CU functions and/or may include mobility management and measurement operations that would otherwise have been performed by base station 12. Primary UE device 10-1 may be particularly suited to performing these mobility management and measurement operations because UE device 10-1 is likely located closer to one or more secondary UE devices 10-2 than base station 12. The example of FIG. 3 is merely illustrative and, in general, there may be any number of secondary UE devices 10-2 that communicate with any desired number of primary UE devices 10-1 and any desired number of base stations 12.

Figure 4:
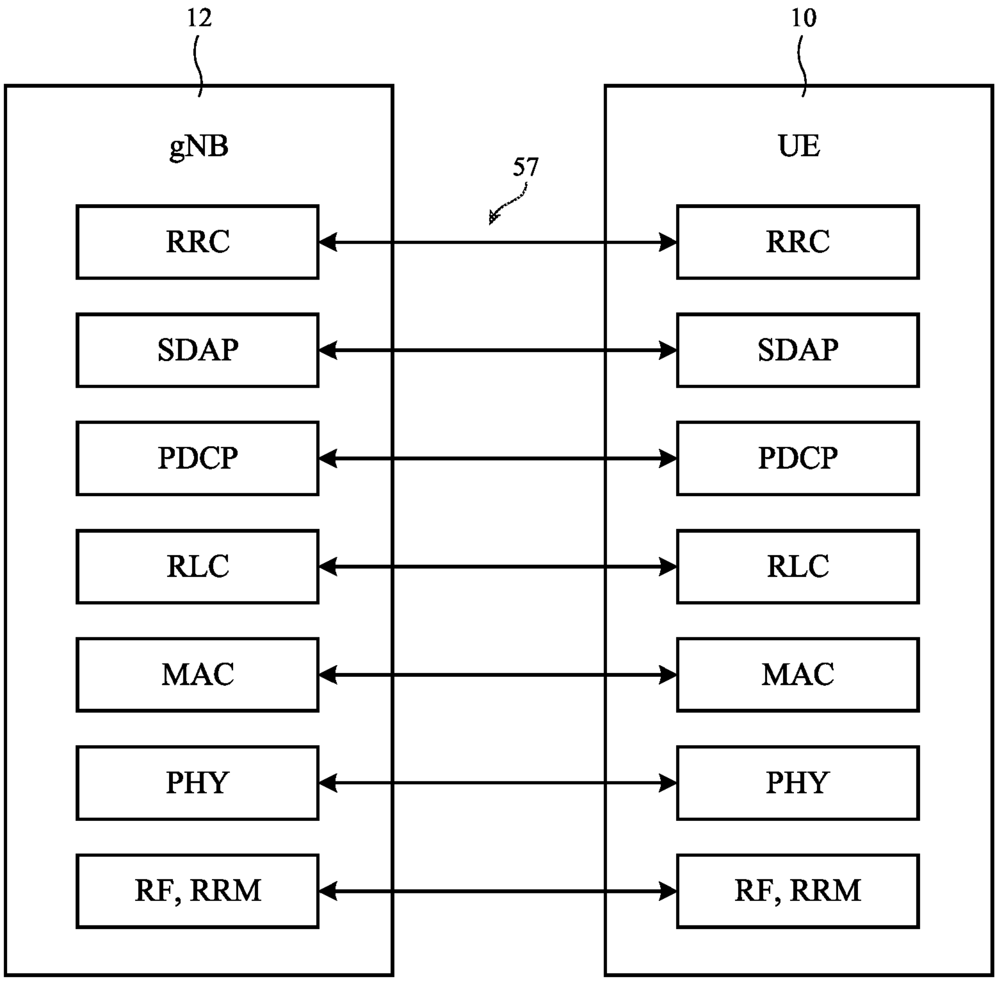
FIG. 4 is a diagram of an illustrative protocol stack associated with wireless communications between a user equipment device and a wireless base station in accordance with some embodiments.

FIG. 4 is a diagram of an illustrative protocol stack associated with wireless communications between a UE device 10 (e.g., primary UE device 10-1 and/or secondary UE device 10-2) and base station 12. As shown in FIG. 4, UE device 10 and base station 12 may each include a multi-layer protocol stack (e.g., a 5G cellular communications protocol stack) with, in order from lowest-to-highest, a radio layer (e.g., radio-frequency (RF) and radio resource management (RRM) layer), a physical (PHY) layer, a MAC layer, an RLC layer, a PDCP layer, an SDAP layer, and an RRC layer. Each protocol stack layer has a UE entity and a base station entity that communicate over the wireless link maintained by the corresponding radio-frequency signals 16 (FIGS. 1 and 3), as shown by arrows 57. In general, the communications functions of each layer are different between base station 12 and UE device 10. However, when UE device 10 is configured as primary UE device 10-1 (FIGS. 1 and 3) and implements the active/replicated DU 54 of FIG. 3, the PDCP/RLC functions of base station 12 are copied and performed by primary UE device 10-1 (e.g., while being agnostic to the PHY layer) in communicating with secondary UE device 10-2 over inter-UE signals 18-1 (e.g., while base station 12 concurrently performs the PDCP/RLC functions in communicating with secondary UE device 10-2 over radio-frequency signals 16-2).

Figure 5:
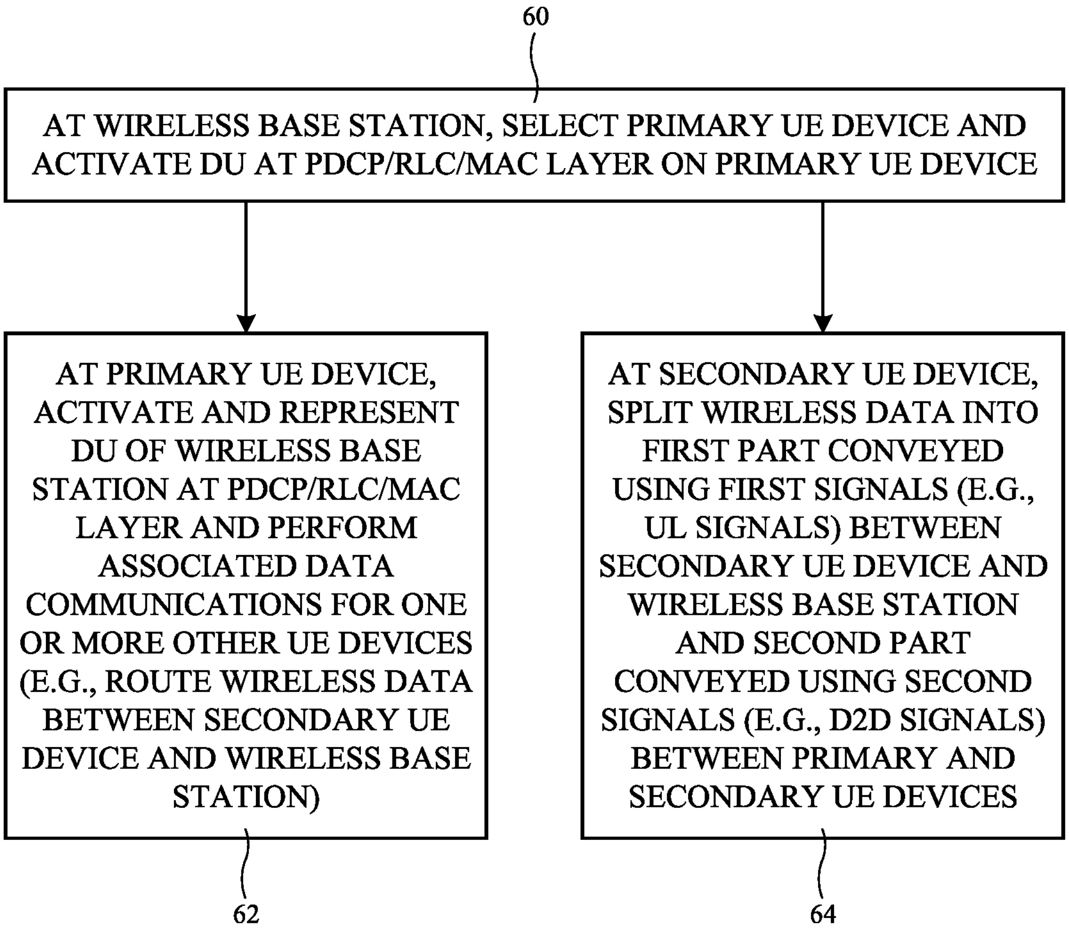
FIG. 5 is a flow chart of illustrative operations involved in using a primary user equipment device to copy and perform data unit functions of a wireless base station for one or more secondary user equipment devices in accordance with some embodiments.

FIG. 5 is a flow chart of illustrative operations that may be performed by communications system 20 to replicate DU 54 of base station 12 at primary UE device 10-1 for routing wireless data for secondary UE device 10-2. At operation 60, base station 12 may select a UE device 10 within its cell to serve as primary UE device 10-1. For example, base station 12 may perform an election procedure to identify and select a UE device 10 having superior hardware, software, power/battery level, radio-frequency capabilities, CPU/GPU capabilities, link quality, etc. than one or more other UE devices to serve as primary UE device 10-1. Base station 12 may provide a control signal to the selected primary UE device 10-1 (e.g., over radio-frequency signals 16-1) that inform primary UE device 10-1 of its selection and that activates DU 54 on primary UE device 10-1.

Processing may proceed to operations 62 and 64, which are performed concurrently. At operation 62, primary UE device 10-1 may activate its DU 54 (e.g., a replica or copy of DU 54 of base station 12), effectuating/producing a DU split (e.g., a bearer duplication/split) between base station 12 and primary UE device 10-1 at the PDCP/RLC layer for secondary UE device 10-2. Primary UE device 10-1 may thereafter perform the functions of DU 54 to route wireless data between UE device 10-2 and base station 12 using radio-frequency signals 16-1 and inter-UE signals 18-1. The functions of DU 54 performed by primary UE device 10-1 may, for example, be the same as those performed by base station 12 (e.g., at the PDCP/RLC layer).

Meanwhile, at operation 64, secondary UE device 10 may split its wireless data (e.g., downlink data received or uplink data transmitted) between inter-UE signals 18-1 and radio-frequency signals 16-2. From the perspective of secondary UE device 10-2, primary UE device 10-1 may appear as a base station due to the activation of DU 54 on primary UE device 10-1. A first portion of the wireless data may be conveyed with base station 12 through primary UE device 10-1, radio-frequency signals 16-1, and inter-UE signals 18-1, while a second portion of the wireless data is concurrently conveyed directly with base station 12 via radio-frequency signals 16-2. Inter-UE signals 18-1 may be D2D signals, BT signals, cellular signals, or Wi-Fi signals, as examples. Radio-frequency signals 16-2 may be cellular telephone signals. Operating with dual connectivity in this way may boost the wireless performance of secondary UE device 10-2 in conveying the wireless data with base station 12, taking advantage of the superior capabilities and/or link quality of primary UE device 10-1.

Figure 6:
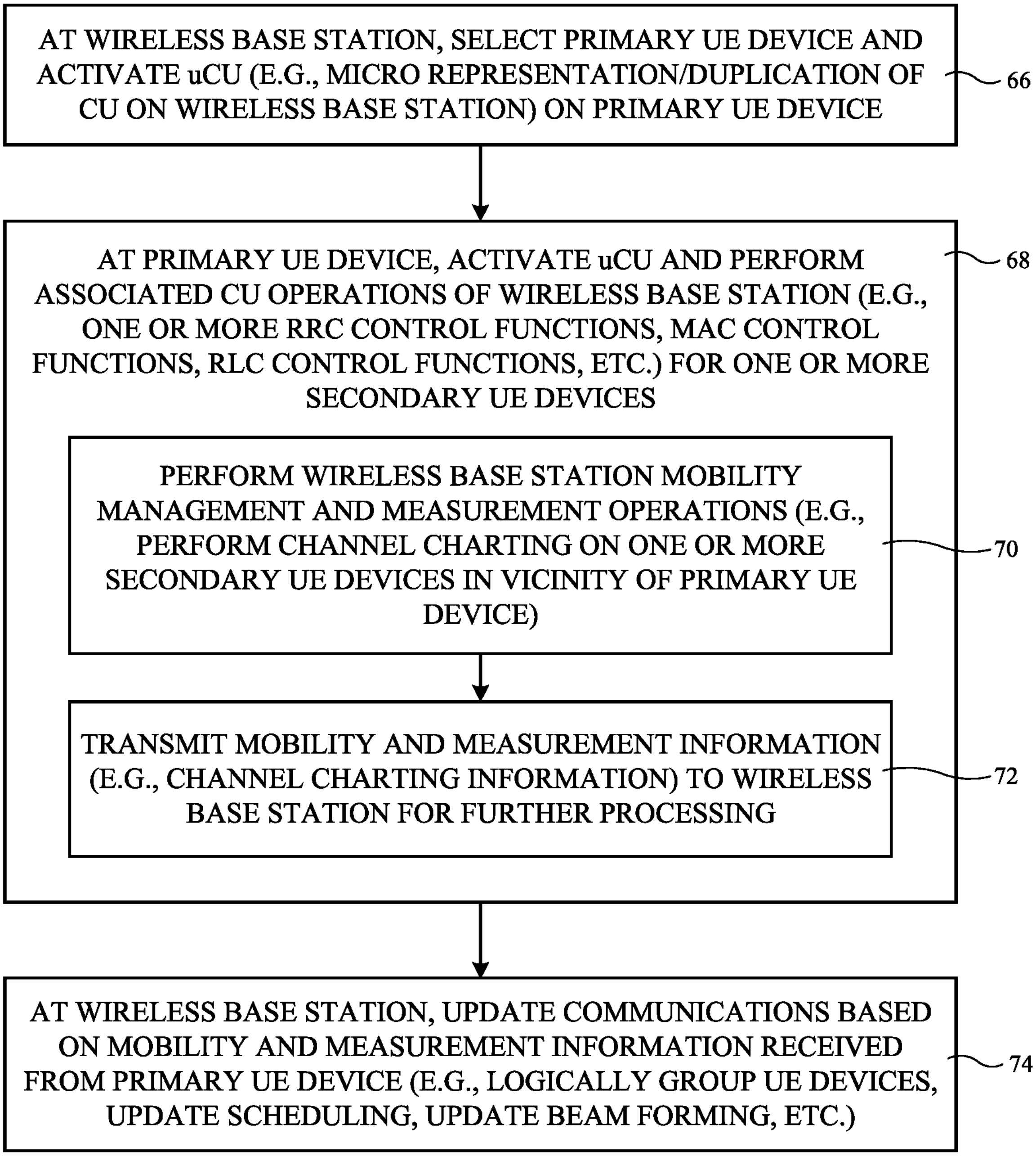
FIG. 6 is a flow chart of illustrative operations involved in using a primary user equipment device to copy and perform control unit functions of a wireless base station for one or more secondary user equipment devices in accordance with some embodiments.

FIG. 6 is flow chart of illustrative operations that may be performed by communications system 20 to replicate a portion of CU 52 of base station 12 at primary UE device 10-1 for controlling wireless data communications for one or more secondary UE devices 10-2. At operation 66, base station 12 may select a UE device 10 to serve as primary UE device 10-1 (e.g., similar to operation 60 of FIG. 5). Base station 12 may provide a control signal to the selected primary UE device 10-1 that inform primary UE device 10-1 of its selection and that activates uCU 56 on primary UE device 10-1.

At operation 68, primary UE device 10-1 may activate its uCU 56 (e.g., a replica or copy of a portion of CU 52 of base station 12), effectuating/producing a partial CU split between base station 12 and primary UE device 10-1 for one or more secondary UE devices 10-2. Primary UE device 10-1 may thereafter perform the functions of uCU 56 (e.g., the corresponding copied functions of CU 52) to control communications between the one or more secondary UE devices 10-2 and base station 12. The copied control functions of CU 52 of base station 12 that are implemented on uCU 56 of primary UE device 10-1 may include, for example, one or more RRC control functions, one or more MAC control functions, one or more RLC control functions, etc.

If desired, the control functions of uCU 56 may involve performing mobility management and measurement operations that would otherwise be performed by base station 12 (at operation 70). The mobility management and measurement operations may involve primary UE device 10-1 using inter-UE signals 18 to gather mobility and measurement information such as channel, signal, or link quality measurements (e.g., wireless performance metric measurements) associated with the secondary UE devices 10-2 in its vicinity and/or wireless performance metric measurements and/or location information associated with the secondary UE devices 10-2 gathered by primary UE device 10-1 itself. The mobility management and measurement operations may, for example, include channel charting operations on the secondary UE devices 10-2 in its vicinity.

Processing may then proceed to operation 72, at which primary UE device 10-2 transmits the gathered mobility management and measurement information to base station 12 (e.g., using radio-frequency signals 16-1). The mobility management and measurement information may, for example, include channel charting information such as a neighbors map gathered while primary UE device 10-1 performs channel charting on the secondary UE devices 10-2 in its vicinity.

At operation 74, base station 12 may perform any desired operations based on the control functions performed by primary UE device 10-1 in accordance with uCU 56 (e.g., base station 12 may perform any desired operations based on the mobility and measurement information gathered by primary UE device 10-1). For example, base station 12 may update one or more communications schedules for one or more secondary UE devices 10-2 based on the mobility and measurement information gathered by primary UE device 10-1. As another example, base station 12 may perform beam forming based on the mobility and measurement information gathered by primary UE device 10-1 (e.g., based on the channel charting information or neighbors map gathered by primary UE device 10-1). The beam forming may, for example, be updated to point one or more signal beams towards secondary UE devices 10-2 and/or to share a single signal beam between multiple secondary UE devices 10-2. In these scenarios, phased antenna arrays on base station 12 may include a number of individual antenna elements that are provided with selected phases and magnitudes (e.g., using phase and magnitude controllers) that cause the signals transmitted/received by each antenna element to constructively and destructively interfere to form a combined signal beam in a selected beam pointing direction (e.g., a direction of peak signal gain). The beam may be formed such that the signal beam(s) point towards one or more UE devices (e.g., so the signal beam(s) overlap the spatial location of the UE devices), thereby allowing wireless data to be conveyed between the UE devices and the base station. Beam forming techniques are particularly important at high frequencies such as frequencies between about 10-1000 GHz, due to the high signal attenuation associated with these frequencies.

Figure 7:
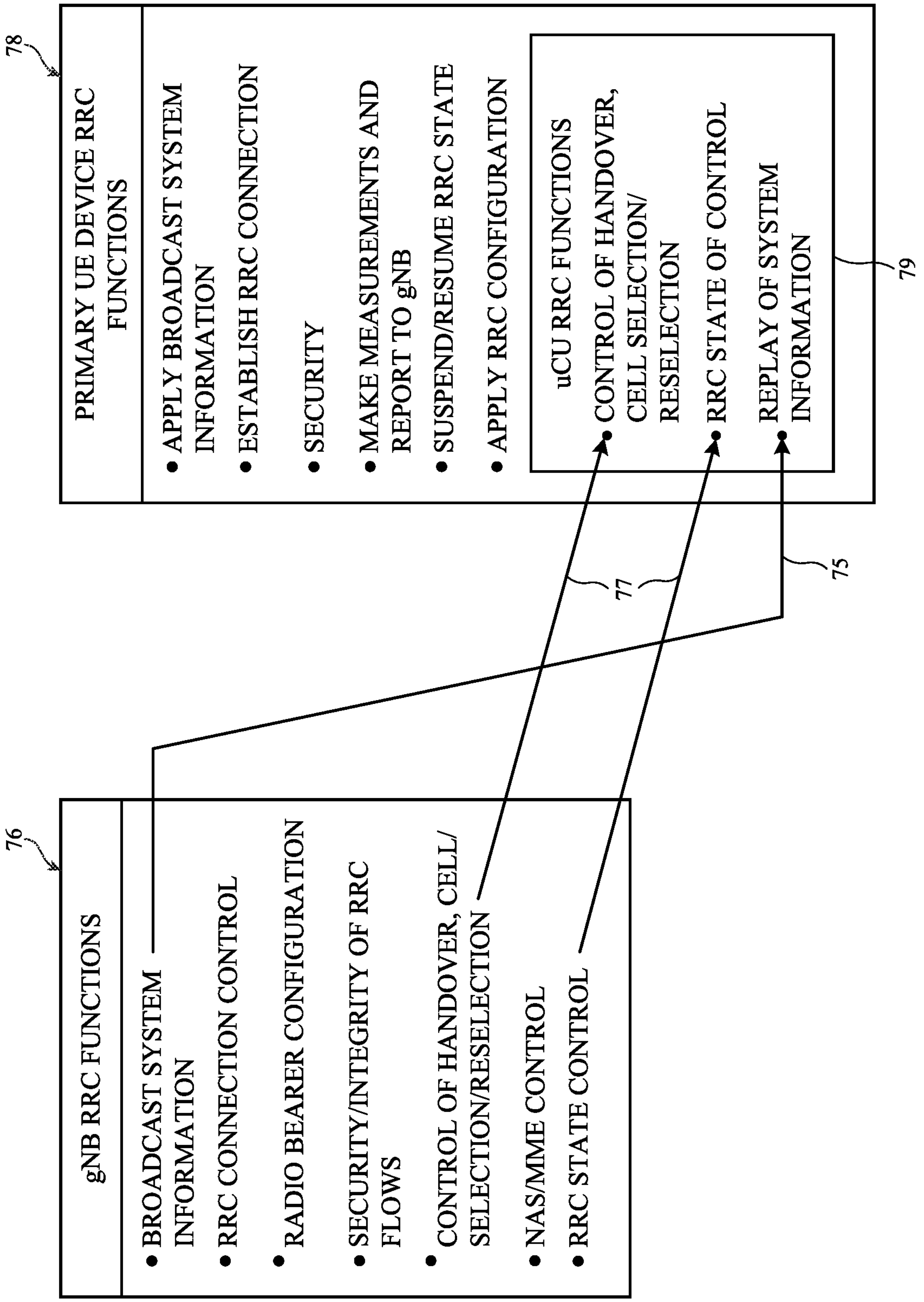
FIG. 7 is a diagram showing how the control unit functions of a wireless base station copied and performed by an illustrative primary user equipment device may include radio resource control (RRC) functions of the wireless base station in accordance with some embodiments.

The control unit functions of CU 52 performed by uCU 56 at operation 68 may include any desired CU functions such as RRC control functions, MAC control functions, RLC control functions etc. Offloading these CU functions to primary UE device 10-1 may serve to optimize wireless performance across secondary UE devices 10-2, because primary UE device 10-1 is likely located closer to the secondary UE devices 10-2 within range of inter-UE signals 18 than base station 12 and is therefore more readily able to gather accurate information characterizing the wireless performance of the secondary UE devices. FIG. 7 is a diagram showing illustrative RRC functions of CU 52 of base station 12 that may be performed by uCU 56 on primary UE device 10-1 when uCU 56 is active (e.g., while processing operation 68 of FIG. 6).

As shown in FIG. 7, table 76 lists RRC functions of CU 52 on base station 12. The RRC functions may include broadcasting system information, RRC connection control, radio bearer configuration, security/integrity of RRC flows, control of handover, cell selection, and cell reselection, non-access stratum (NAS)/mobility management entity (MME) control, and RRC state control.

Table 78 lists RRC functions that are performed by primary UE device 10-1. In general, RRC functionalities are different between a given UE device 10 and base station 12. For example, all UE devices 10 may perform RRC functions that are different than the RRC functions performed by base station 12, such as applying system information broadcast by base station 12, establishing an RRC connection, security functions, making signal measurements and reporting to base station 12, suspending/resuming the RRC state, and applying an RRC configuration.

However, uCU 56 on primary UE device 10-1 may also include additional RRC functions 79 that are mimicked or duplicated RRC functions from CU 52 of base station 12. Additional RRC functions 79 are not performed by secondary UE devices 10-2 (e.g., because secondary UE devices 10-2 do not have an active uCU 56). As shown in FIG. 7, the RRC functions that are duplicated from CU 52 of base station 12 may include control of handover, cell selection, and cell reselection and RRC state control, as shown by arrows 77. In addition, the RRC functions of uCU 56 may include relay (to secondary UE device(s) 10-2) of the system information broadcast by base station 12. This function effectively mimics the broadcast of system information RRC function of base station 12 (as shown by arrow 75), causing primary UE device 10-1 to appear to secondary UE devices 10-2 as if the primary UE device broadcasted the system information. The example of FIG. 7 is merely illustrative. The RRC functionality of base station 12 may include additional functions and the RRC functionality of the UE device may include additional RRC functions. Similarly, one or more MAC control functions, RLC control functions, or other control functions from CU 52 of base station 12 may be duplicated on uCU 56 of primary UE device 10-1 in interfacing with secondary UE devices 10-2.

Figure 8:
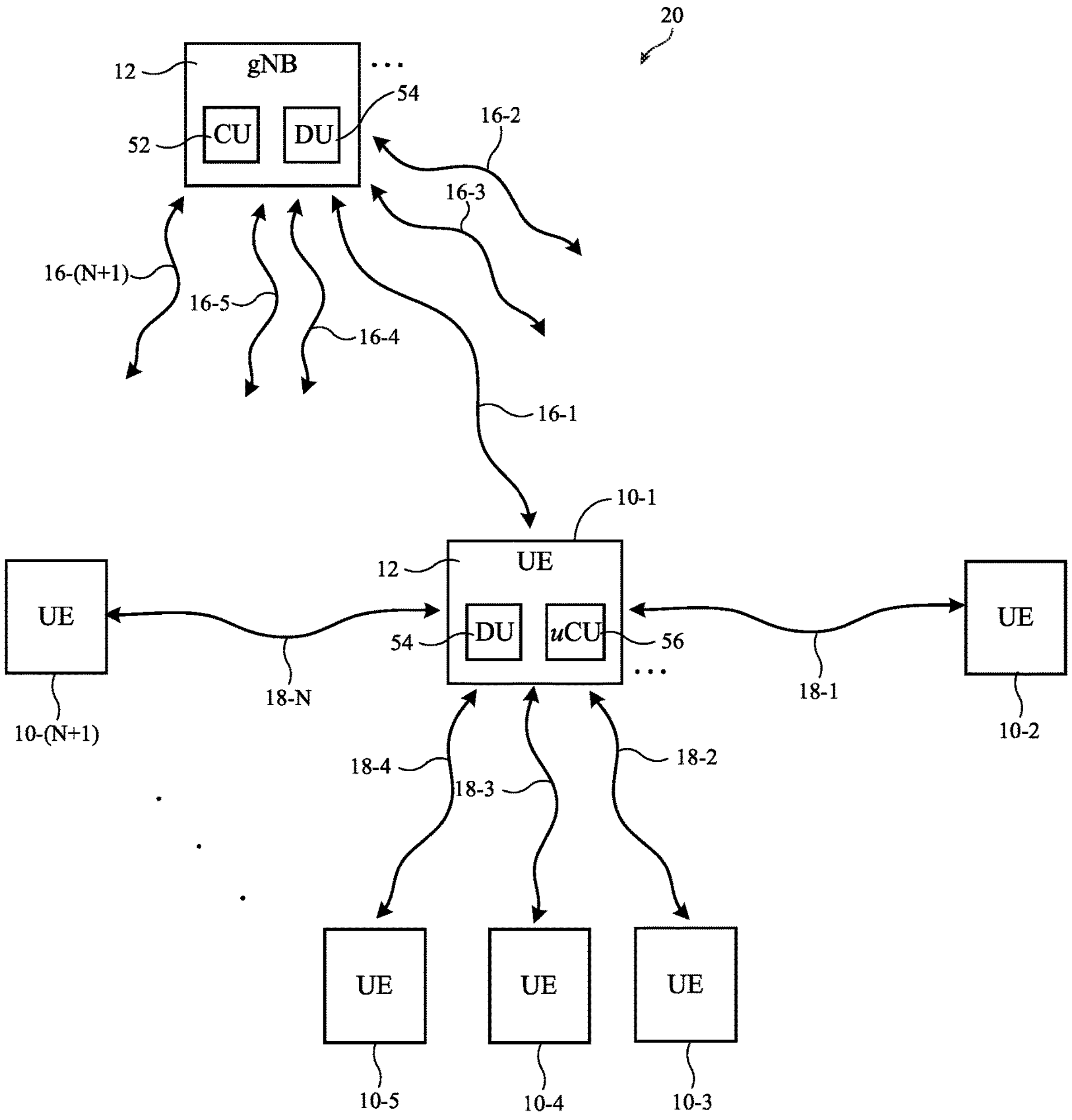
FIG. 8 is a diagram showing how the control unit functions of a wireless base station performed by an illustrative primary user equipment device may include gathering measurements associated with channel conditions from multiple secondary user equipment devices in accordance with some embodiments.

The CU functions of base station 12 performed by uCU 56 on primary UE device 10-1 may be used to help coordinate and control communications for multiple secondary UE devices 10-2 in the vicinity of primary UE device 10-1. FIG. 8 is a diagram showing how the CU functions of base station 12 may be performed by primary UE device 10-1 to help coordinate and control communications for multiple secondary UE devices 10-2 in the vicinity of primary UE device 10-1 (e.g., for performing some mobility and measurement operations of the base station at primary UE device 10-1).

As shown in FIG. 8, there may be N secondary UE devices in the vicinity of primary UE device 10-1 such as a first secondary UE device 10-2, a second secondary UE device 10-3, a third secondary UE device 10-4, a fourth secondary UE device 10-5, an Nth secondary UE device 10-(N+1), etc. Each secondary UE device may communicate directly with base station 12 over respective radio-frequency signals 16 (e.g., secondary UE device 10-2 may communicate with base station 12 using radio-frequency signals 16-2, secondary UE device 10-3 may communicate with base station 12 using radio-frequency signals 16-3, secondary UE device 10-4 may communicate with base station 12 using radio-frequency signals 16-4, etc.).

At the same time, each secondary UE device may communicate with base station 12 via respective inter-UE signals 18 (e.g., secondary UE device 10-2 may communicate with primary UE device 10-1 using inter-UE signals 18-1, secondary UE device 10-3 may communicate with primary UE device 10-1 using inter-UE signals 18-2, secondary UE device 10-4 may communicate with primary UE device 10-1 using inter-UE signals 18-4, etc.). When the replicated DU 54 on primary UE device 10-1 is active, each secondary UE device may concurrently convey wireless data with base station 12 using its corresponding radio-frequency signals 16 and via primary UE device 10-1 using its corresponding inter-UE signals 18 (e.g., while processing the operations of FIG. 5). When uCU 56 (e.g., the duplicated or mimicked portion of CU 52 on base station 12) is active on primary UE device 10-1, primary UE device 10-1 may perform the CU operations of uCU 56 (e.g., while processing operation 68 of FIG. 6). Primary UE device 10-1 may perform the DU functions of DU 54 and the CU functions of uCU 56 concurrently (e.g., the operations of FIGS. 5 and 6 may be performed concurrently).

The CU functions performed by primary UE device 10-1 (e.g., according to uCU 56) may include RRC control functions (e.g., as shown in FIG. 7), MAC control functions, RLC control functions, or other control functions. The control functions may include performing mobility management and measurement operations that would otherwise be performed by base station 12 on the secondary UE devices. For example, primary UE device 10-1 may use inter-UE signals 18 to gather mobility and measurement information such as sensing information gathered by sensors on the secondary UE devices (e.g., sensor data indicative of the location, orientation, movement, and/or wireless performance of the secondary UE devices) and/or wireless performance metric information gathered by the wireless circuitry on the secondary UE devices from the corresponding radio-frequency signals 16 conveyed with base station 12 and/or the corresponding inter-UE signals 18 conveyed with primary UE device 10-1 (e.g., measured Reference Signal Received Power (RSRP) values, Received Signal Strength Indicator (RSSI) values, power levels, error rates, Signal-to-Noise Ratio (SNR) values, etc.). Additionally or alternatively, the mobility and measurement information may include sensing information gathered by one or more sensors on primary UE device 10-1 (e.g., sensor data indicative of the location, orientation, movement, and/or wireless performance of the secondary UE devices) and/or wireless performance metric information gathered by the wireless circuitry on primary UE device 10-1 from the inter-UE signals 18 transmitted by the secondary UE devices (e.g., measured Reference Signal Received Power (RSRP) values, Received Signal Strength Indicator (RSSI) values, power levels, error rates, Signal-to-Noise Ratio (SNR) values, etc.). In examples where the mobility and measurement information includes wireless performance metric data gathered from inter-UE signals 18, configuration of these measurements may be performed via a cellular protocol (e.g., SIB, SSB, measurement object, etc.).

Primary UE device 10-1 may transmit the gathered mobility and measurement information to base station 12 for further processing. If desired, primary UE device 10-1 may perform some of the processing on the gathered mobility and measurement information (e.g., as associated with uCU 56) that would otherwise have been performed by base station 12. For example, primary UE device 10-1 may perform channel charting using the mobility and measurement information.

Figure 9:
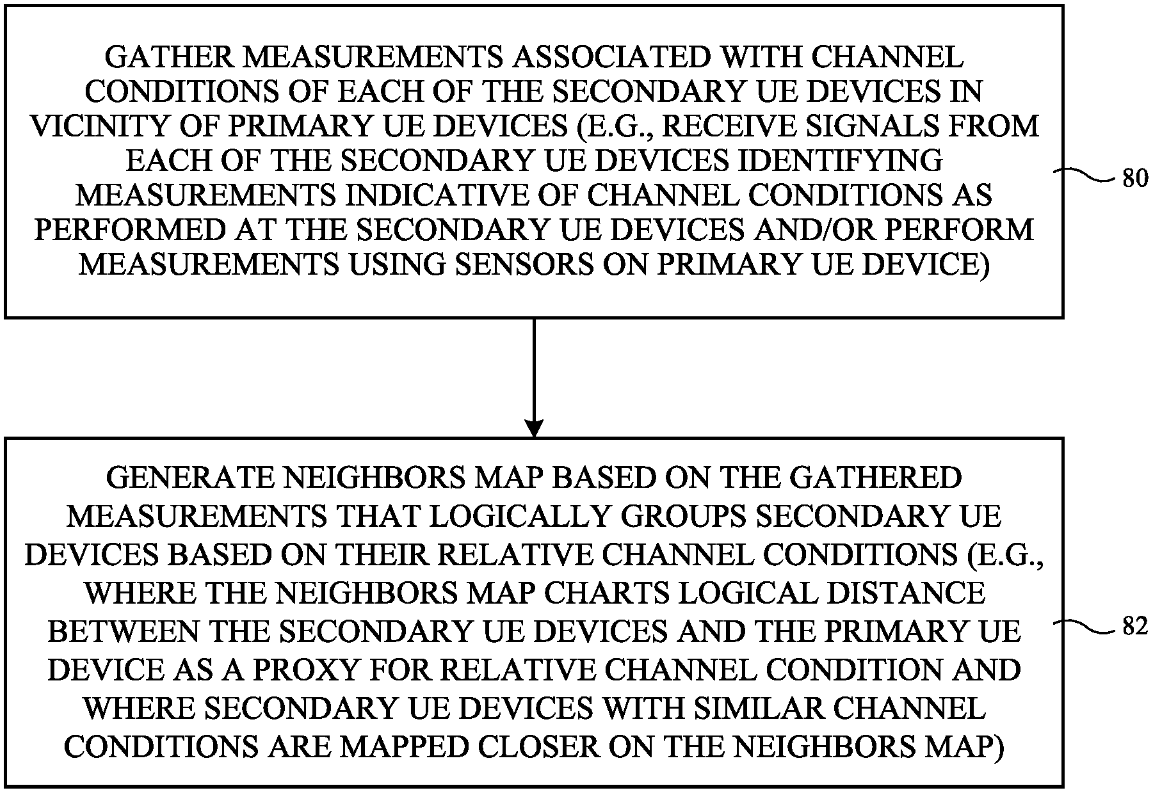
FIG. 9 is a flow chart of illustrative operations involved in using a primary user equipment device to perform channel charting on multiple secondary user equipment devices in accordance with some embodiments.

FIG. 9 is a flow chart of illustrative operations that may be performed by primary UE device 10-1 to perform channel charting on the N secondary UE devices of FIG. 8. The operations of FIG. 9 may, for example, be performed while processing operation 70 of FIG. 6. At operation 80, primary UE device 10-1 may gather (e.g., receive, retrieve, identify, measure, calculate, compute, sense, etc.) measurements associated with the channel conditions of each of the N secondary UE devices in its vicinity. For example, primary UE device 10-1 may use inter-UE signals 18 to gather measurements such as sensing information gathered by sensors on the secondary UE devices (e.g., sensor data indicative of the location, orientation, movement, and/or wireless performance of the secondary UE devices), wireless performance metric information gathered by the wireless circuitry on the secondary UE devices from the respective radio-frequency signals 16 and/or inter-UE signals 18 received by each secondary UE device (e.g., measured Reference Signal Received Power (RSRP) values, Received Signal Strength Indicator (RSSI) values, power levels, error rates, Signal-to-Noise Ratio (SNR) values, etc.), sensing information gathered by one or more sensors on primary UE device 10-1 (e.g., sensor data indicative of the location, orientation, movement, and/or wireless performance of the secondary UE devices), and/or wireless performance metric information gathered by the wireless circuitry on primary UE device 10-1 from inter-UE signals 18 transmitted by the secondary UE devices (e.g., measured Reference Signal Received Power (RSRP) values, Received Signal Strength Indicator (RSSI) values, power levels, error rates, Signal-to-Noise Ratio (SNR) values, etc.).

At operation 82, primary UE device 10-1 may generate a comprehensive map of the secondary UE devices in its vicinity based on the measurements gathered while processing operation 80. For example, primary UE device 10-1 may generate a channel charting neighbors map based on the measurements gathered while processing operation 80. Primary UE device 10-1 may generate the neighbors map by logically grouping secondary UE devices based on their relative channel conditions. The neighbors map may be a logical map (rather than a physical or spatial map) that maps/charts a logical distance between the secondary UE devices and primary UE device 10-1 based on the corresponding channel conditions (as characterized by the measurements gathered while processing operation 80). The logical distance may serve as a proxy for the relative channel conditions (e.g., wireless performance in communicating with base station 12) for each of the secondary UE devices and thus spatial proximity of the secondary UE devices to base station 12. In addition, secondary UE devices having similar channel conditions may be mapped (grouped) closer together on the neighbors map.

Figure 10:
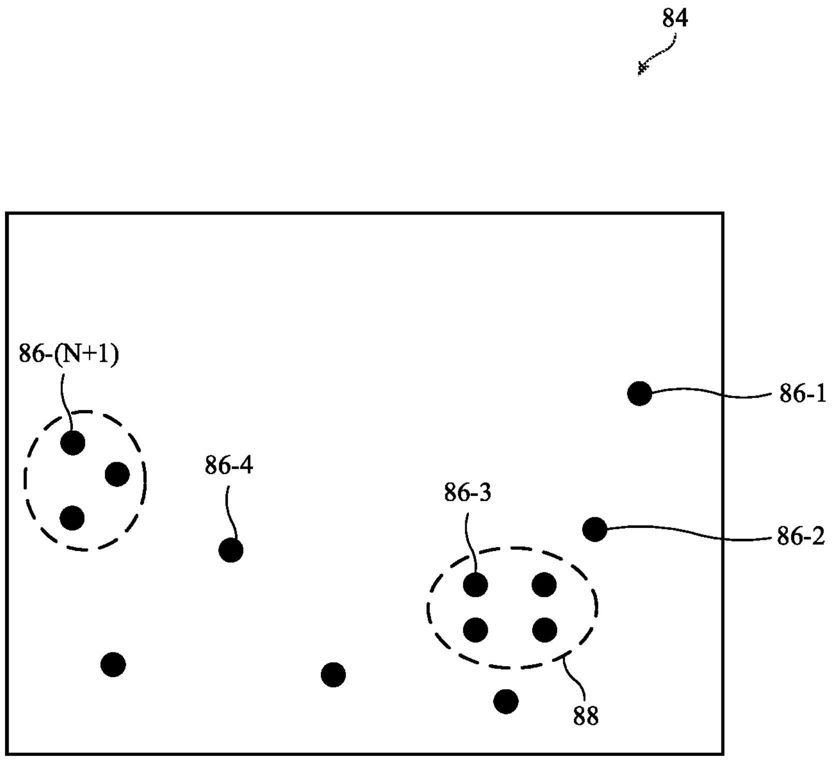
FIG. 10 is a diagram of an illustrative neighbors map that may be generated by a primary user equipment device while performing channel charting on multiple secondary user equipment devices in accordance with some embodiments.

FIG. 10 is a diagram of an exemplary neighbors map that may be produced by primary UE device 10-1 while performing channel charting. As shown in FIG. 10, primary UE device 10-1 may generate neighbors map 84 using the measurements gathered while processing operation 80 of FIG. 9. Each point 86 on neighbors map 84 may logically represent a respective secondary UE device. For example, point 86-1 may represent secondary UE device 10-2 (FIG. 8), point 86-2 may represent secondary UE device 10-3, point 86-3 may represent secondary UE device 10-4, point 86-4 may represent secondary UE device 10-5, point 86-(N+1) may represent secondary UE device 10-(N+1), etc. The location of each point 86 on neighbors map 84 may be determined by the measurement(s) gathered for the corresponding secondary UE device while processing operation 80 of FIG. 9 (e.g., may be determined by the channel conditions of the secondary UE devices).

Secondary UE devices having similar measured channel conditions may be grouped closer together on neighbors map 84 than secondary UE devices having substantially different measured channel conditions. For example, the group of secondary UE devices characterized by points 86 within region 90 may have relatively similar channel conditions to each other, the group of secondary UE devices characterized by points 86 within region 88 may have relatively similar channel conditions to each other, etc. While not a map of spatial location of the secondary UE devices, each of points 86 on neighbors map 84 may effectively correspond to the position of the corresponding secondary UE device relative to base station 12 given that UE devices having similar channel conditions are likely located close together. Even if the UE devices having similar channel conditions are not actually located close together, information about how the secondary UE devices 10 are grouped together based on channel conditions (e.g., as given by neighbors map 84 and produced by primary UE device 10-1) may be useful for base station 12 to efficiently and effectively update how it performs communications with the secondary UE devices.

Primary UE device 10-1 may therefore report this information (neighbors map 84) to base station 12 (e.g., while processing operation 72 of FIG. 6) for use in subsequent processing. Base station 12 may update its communications scheduling and/or beam forming based on the neighbors map 84 generated by primary UE device 10-1. For example, base station 12 may update its beam forming to produce signal beams at orientations that are selected based on the information in neighbors map 84. Base station 12 may even generate signal beams that are shared between multiple secondary UE devices based on the groups of UE devices characterized by points 86 that are located relatively close together on neighbors map 84. For example, base station 12 may generate a first signal beam oriented in a first direction to communicate with each of the secondary UE devices characterized by points 86 within region 90 of neighbors map 84, may generate a second signal beam oriented in a second direction to communicate with each of the secondary UE devices characterized by points 86 within region 88 of neighbors map 84, etc. In this way, mobility management and measurement operations of base station 12 may be partially offloaded to primary UE device 10-1, which may be in a better spatial position to gather mobility and measurement information from the secondary UE devices than base station 12. This may in turn serve to optimize overall wireless data transfer across the secondary UE devices relative to scenarios where no CU operations are offloaded from base station 12 to primary UE device 10-1.

Figure 11:
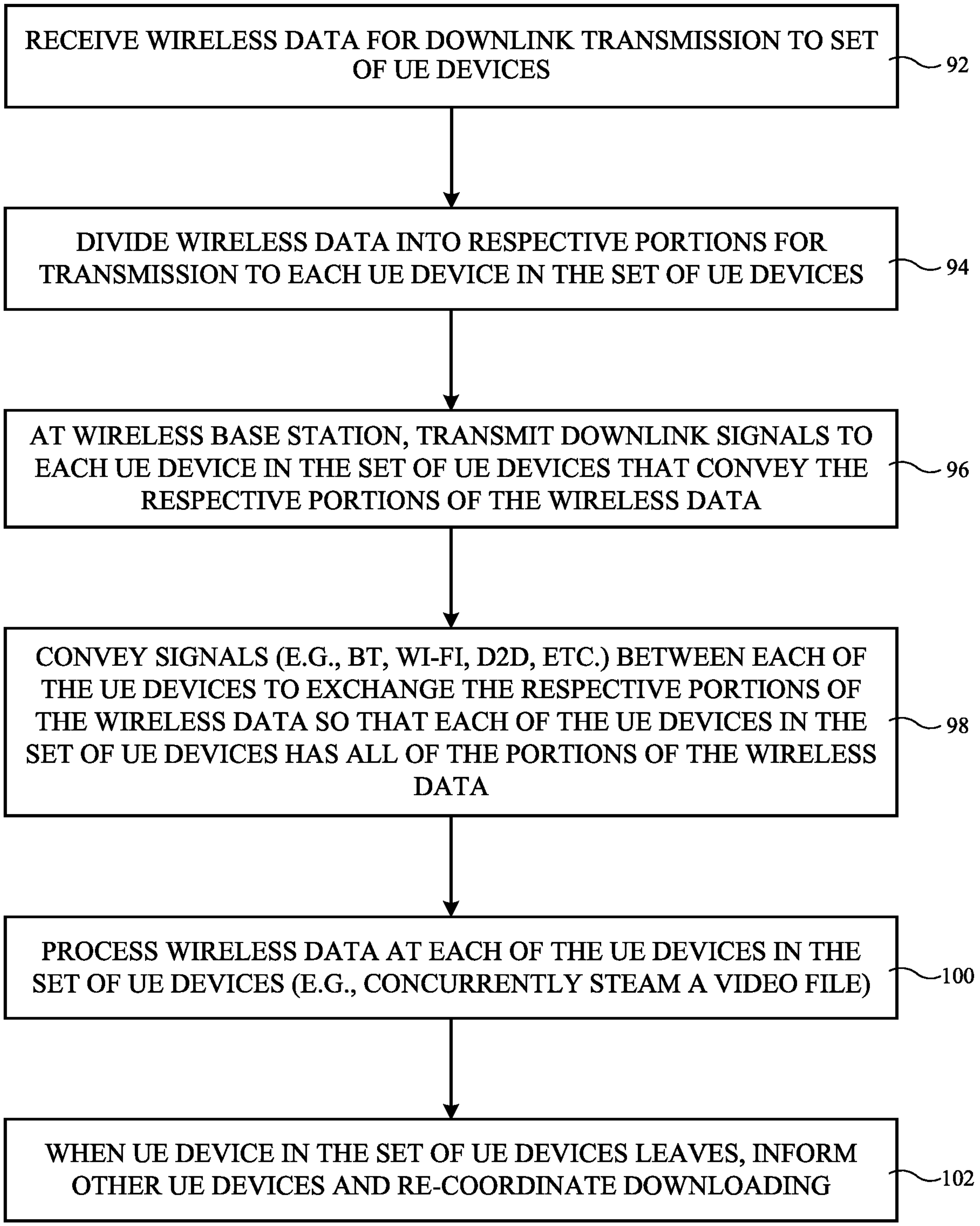
FIG. 11 is a flow chart of illustrative operations involved in dividing and sharing wireless data between multiple user devices in accordance with some embodiments.

In addition to (or instead of) offloading DU 54 and part of CU 52 to primary UE device 10-1 as described above, multiple UE devices 10 in close proximity to each other may divide and share downlink data (e.g., a large file, a large video, or other data) generated by server 14 of FIG. 1. This may, for example, allow the UE devices to conserve data usage and/or allow the UE devices to download a relatively large amount of data even when each UE device has a relatively low bandwidth in communicating with base station 12. FIG. 11 is a flow chart of illustrative operations that may be performed by base station 12 and a set of UE devices in dividing and sharing downlink data generated by server 14.

At operation 92, base station 12 may receive wireless data for downlink transmission to a set of UE devices 10 in close proximity to each other. The wireless data may include, as one example, a large video file that the user of each UE device in the set of UE devices wishes to view.

At operation 94, base station 12 may divide the wireless data into respective portions for downlink transmission to each UE device 10 in the set of UE devices.

At operation 96, base station 12 may use radio-frequency signals 16 to transmit downlink signals to each UE device in the set of UE devices that convey the respective portion of the wireless data. In this way, each UE device 10 may concurrently receive its respective portion of the wireless data.

At operation 98, each UE device in the set of UE devices may convey inter-UE signals 18 with the other UE devices in the set of UE devices to exchange the respective portions of the wireless data received from base station 12. In this way, inter-UE signals 18 may be used to exchange all of the different portions of the wireless data until each UE device in the set of UE devices has the entirety of the wireless data received by base station 12 at operation 92.

At operation 100, the UE devices in the set of UE devices may process the wireless data. For example, each of the UE devices in the set of UE devices may concurrently stream a video file in the wireless data, may concurrently perform cloud computing or processing operations on the wireless data, etc. Processing may loop back to operation 92 as additional wireless data is received.

At operation 102, when one of the UE devices in the set of UE devices desires to leave the set of UE devices, the leaving UE device may inform the other UE devices in the set of UE devices and the remaining UE devices may re-coordinate downloading and sharing of the wireless data. Processing may subsequently loop back to operation 92 as additional wireless data comes in. The set of UE devices may include two UE devices, three UE devices, or more than three UE devices.

Consider one example of application layer processing for such an arrangement in which a first user of a first UE device wishes to watch a video from the Internet with a second user operating a nearby second UE device. The second user may enter a user input instructing the second UE device to wait for a request from the first UE device. The second UE device may use inter-UE signals 18 to broadcast a message to neighboring UE devices that the second UE device is waiting for a request. An output device on the first UE device may show the first user that the second UE device can share video. The first user may enter a user input to the first UE device instructing the first UE device to select the second UE device for sharing the video. The first UE device may use inter-UE signals 18 to send a sharing request message to the second UE device. The first and second UE devices may then use inter-UE signals 18 to coordinate download of the video file from base station 12 (e.g., to coordinate which UE device will download which portion of the video file).

The first UE device may transmit a download request to server 14 via base station 12 and radio-frequency signals 16 identifying a first portion of the video file that the first UE device is to download (e.g., odd-numbered segments/parts of the video file). The second UE device may transmit a download request to server 14 via base station 12 and radio-frequency signals 16 identifying a second portion of the video file that the second UE device is to download (e.g., even-numbered segments/parts of the video file). Base station 12 may receive the video file from server 14, may transmit the first portion of the video file to the first UE device, and may transmit the second portion of the video file to the second UE device (e.g., using radio-frequency signals 16). The first UE device may then use inter-UE signals 18 to transmit the first portion of the video file that it received from base station 12 to the second UE device and the second UE device may use inter-UE signals 18 to transmit the second portion of the video that it received from base station 12 to the first UE device. The first and second UE devices may then concurrently play the video, since each UE device has stored the entire video file. This process may be extended to more than three UE devices if desired.

If any of the UE devices in the set of UE devices downloading different parts of the video file stops downloading and forwarding data to other nodes (which could be forced by its user), then that UE device may use inter-UE signals 18 to notify the other UE devices in the set of UE devices that it is leaving. The remaining UE devices in the set of UE devices may then re-coordinate which portions of the video file each UE device is to download and may request those new portions for download from server 14. This example is merely illustrative and, in general, the video data may be any other desired data.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-11 (e.g., the operations of FIGS. 5, 6, and 9) may be performed by the components of UE device 10, base station 12, and/or server 14 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 30 of FIG. 2). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 32 of FIG. 2, etc.). The processing circuitry may include microprocessors, central processing units (CPUs), application-specific integrated circuits with processing circuitry, or other processing circuitry.

If desired, an apparatus may be provided that includes means to perform one or more elements or any combination of elements of one or more methods or processes described herein.

If desired, one or more non-transitory computer-readable media may be provided that include instructions to cause an electronic device, upon execution of the instructions by one or more processors of the electronic device, to perform one or more elements or any combination of elements of one or more methods or processes described herein.

If desired, an apparatus may be provided that includes logic, modules, or circuitry to perform one or more elements or any combination of elements of one or more methods or processes described herein.

If desired, an apparatus may be provided that includes one or more processors and one or more non-transitory computer-readable storage media comprising instructions that, when executed by the one or more processors, cause the one or more processors to perform one or more elements or any combination of elements of one or more methods or processes described herein.

If desired, a signal (e.g., a signal encoded with data), datagram, information element (IE), packet, frame, segment, PDU, or message may be provided that includes or performs one or more elements or any combination of elements of one or more methods or processes described herein.

If desired, an electromagnetic signal may be provided that carries computer-readable instructions, where execution of the computer-readable instructions by one or more processors causes the one or more processors to perform one or more elements or any combination of elements of one or more methods or processes described herein.

If desired, a computer program may be provided that includes instructions, where execution of the program by a processing element causes the processing element to carry out one or more elements or any combination of elements of one or more methods or processes described herein.

The foregoing is merely illustrative and various modifications can be made to the described embodiments. The foregoing embodiments may be implemented individually or in any combination.

What is claimed is:

1. An electronic device comprising:

a radio configured to convey first radio signals to communicate with a wireless base station that performs wireless functions characterized by a data unit (DU) and control unit (CU); and one or more processors configured to duplicate a function of a radio link control (RLC) layer or a media access control (MAC) layer of the DU of the wireless base station that, when activated by the wireless base station, controls the radio to route a first portion of wireless data between the wireless base station and a user equipment device using the first radio signals and second radio signals, the second radio signals being conveyed between the electronic device and the user equipment device while the user equipment device concurrently conveys a second portion of the wireless data with the wireless base station using third radio signals conveyed between the user equipment device and the wireless base station.

2. The electronic device of claim 1, wherein the second radio signals comprise Wi-Fi signals, Bluetooth signals, cellular telephone signals, or device-to-device (D2D) signals.

3. The electronic device of claim 2, wherein the first radio signals and the third radio signals comprise cellular telephone signals.

4. The electronic device of claim 1 wherein the CU of the wireless base station has a set of associated control functions, the one or more processors being further configured to:

duplicate and perform a subset of the control functions associated with the CU of the wireless base station.

5. The electronic device of claim 4, wherein the subset of the control functions comprises a Radio Resource Control (RRC) function.

6. The electronic device of claim 5, wherein the RRC function comprises controlling handover, cell selection, or cell reselection of the user equipment device.

7. The electronic device of claim 5, wherein the RRC function comprises an RRC state control function.

8. The electronic device of claim 5, wherein the RRC function comprises relay of system information broadcast by the wireless base station to the user equipment device over the second radio signals.

9. The electronic device of claim 4, wherein the subset of the control functions comprises a Media Access Control (MAC) control function.

10. The electronic device of claim 4, wherein the subset of the control functions comprises using the second radio signals to gather mobility and measurement information associated with the user equipment device and wherein the subset of the control functions comprises performing channel charting.

11. The electronic device of claim 1, wherein:

the second radio signals comprise inter-user equipment signals, the CU has associated CU functions, the one or more processors are further configured to perform, based on the inter-user equipment signals, a subset of the CU functions that produces measurement information associated with a channel condition of the user equipment device, and the radio is further configured to transmit the measurement information to the wireless base station.

12. The electronic device of claim 1, wherein:

the second radio signals comprise inter-user equipment signals, the one or more processors are further configured to perform a channel charting based on the inter-user equipment signals that produces a neighbors map that includes the user equipment device, and the radio is further configured to transmit the neighbors map to the wireless base station.

13. The electronic device of claim 12, the one or more processors being configured to perform the channel charting by:

generating wireless performance metric information associated with a channel condition of the user equipment device, and logically grouping the user equipment device in a set of additional user equipment devices based on the wireless performance metric information.

14. Wireless circuitry comprising:

a radio configured to convey first signals to communicate with a wireless base station that performs data unit (DU) functions and control unit (CU) functions; and one or more processors configured to duplicate at least one of the DU functions that, when activated by the wireless base station, control the radio to route a first portion of wireless data between the wireless base station and a user equipment device using the first signals and using second signals, the second signals being conveyed between the wireless circuitry and the user equipment device while the user equipment device concurrently conveys a second portion of the wireless data with the wireless base station using third signals conveyed between the user equipment device and the wireless base station, the radio being configured to relay, to the user equipment device over the second signals, system information broadcast by the wireless base station.

15. The wireless circuitry of claim 14, wherein:

the second signals comprise Wi-Fi signals, Bluetooth signals, cellular telephone signals, or device-to-device (D2D) signals, the first and third signals comprise additional cellular telephone signals, and the at least one of the DU functions comprises a radio link control (RLC) layer function, a packet data convergence protocol (PDCP) layer function, or a media access control (MAC) layer function.

16. The wireless circuitry of claim 14, the one or more processors being further configured to:

duplicate and perform a subset of the CU functions.

17. The wireless circuitry of claim 16, wherein the subset of the CU functions comprises controlling handover, cell selection, or cell reselection of the user equipment device.

18. The wireless circuitry of claim 16, wherein the subset of the CU functions comprises:

using the second signals to gather mobility and measurement information associated with the user equipment device, and performing channel charting based on the mobility and measurement information.

19. A method of operating wireless circuitry, the method comprising:

conveying, using a radio, first signals to communicate with a wireless base station that performs data unit (DU) functions and control unit (CU) functions, duplicating, using one or more processors, at least one of the DU functions, wherein the at least one of the DU functions comprises a radio link control (RLC) layer function or a media access control (MAC) layer function; and after the at least one of the DU functions has been activated by the wireless base station, routing, using the radio, a first portion of wireless data between the wireless base station and a user equipment device using the first signals and second signals, wherein the second signals are conveyed between the wireless circuitry and the user equipment device while the user equipment device concurrently conveys a second portion of the wireless data with the wireless base station using third radio signals that are conveyed between the user equipment device and the wireless base station.

20. The method of claim 19, further comprising:

using the second radio signals to generate mobility and measurement information associated with the user equipment device; and performing channel charting based on the mobility and measurement information.

* * * * *